(12) United States Patent
Le Gallo-Bourdeau et al.

(10) Patent No.: US 11,226,763 B2
(45) Date of Patent: Jan. 18, 2022

(54) DEVICE FOR HIGH DIMENSIONAL COMPUTING COMPRISING AN ASSOCIATIVE MEMORY MODULE

(71) Applicants: International Business Machines Corporation, Armonk, NY (US); ETH Zurich, Zurich (CH)

(72) Inventors: Manuel Le Gallo-Bourdeau, Zurich (CH); Kumudu Geethan Karunaratne, Zurich (CH); Giovanni Cherubini, Rueschlikon (CH); Abu Sebastian, Adliswil (CH); Abbas Rahimi, Dubendort (CH); Luca Benini, Zurich (CH)

(73) Assignees: International Business Machines Corporation, Armonk, NY (US); ETH ZURICH (EIDGENOESSISCHE TECHNISCHE HOCHSCHULE ZURICH), Zurich (CH)

( * ) Notice: Subject to any disclaimer, the term of this patent is extended or adjusted under 35 U.S.C. 154(b) by 330 days.

(21) Appl. No.: 16/426,482

(22) Filed: May 30, 2019

(65) Prior Publication Data
US 2020/0379673 A1    Dec. 3, 2020

(51) Int. Cl.
G06N 20/00    (2019.01)
G06F 3/06     (2006.01)
G06G 7/22     (2006.01)

(52) U.S. Cl.
CPC .......... G06F 3/0655 (2013.01); G06F 3/0673 (2013.01); G06G 7/22 (2013.01); G06N 20/00 (2019.01)

(58) Field of Classification Search
CPC ................ G06G 7/22; G06N 20/00; G11C 13/0002–0004; G06F 17/16
See application file for complete search history.

(56) References Cited

U.S. PATENT DOCUMENTS 7,489,583 B2   2/2009  Kuekes et al.
9,152,827 B2   10/2015 Linderman et al.
(Continued)

FOREIGN PATENT DOCUMENTS

EP   3261091 A1   12/2017
WO   WO-2016122525 A1 * 8/2016 ......... G11C 13/0007

OTHER PUBLICATIONS

Karunaratne, Geethan, et al. "In-Memory Hyperdimensional Computing." ArXiv.org, Apr. 9, 2020, arxiv.org/abs/1906.01548. (Year: 2020).*

(Continued)

*Primary Examiner* — Matthew D Sandifer
*Assistant Examiner* — Huy Duong
(74) *Attorney, Agent, or Firm* — Daniel Morris; Otterstedt, Wallace & Kammer, LLP

(57) ABSTRACT

The invention is notably directed at a device for high-dimensional computing comprising an associative memory module. The associative memory module comprises one or more planar crossbar arrays. The one or more planar crossbar arrays comprise a plurality of resistive memory elements. The device is configured to program profile vector elements of profile hypervectors as conductance states of the resistive memory elements and to apply query vector elements of query hypervectors as read voltages to the one or more crossbar arrays. The device is further configured to perform a distance computation between the profile hypervectors and the query hypervectors by measuring output current signals of the one or more crossbar arrays. The invention further concerns a related method and a related computer program product.

19 Claims, 6 Drawing Sheets

(56) References Cited

U.S. PATENT DOCUMENTS

| | | | |
|---|---|---|---|
| 9,319,047 | B2 | 4/2016 | Jha et al. |
| 10,572,795 | B1 | 2/2020 | Dockendorf et al. |
| 2008/0089110 | A1* | 4/2008 | Robinett ............ G11C 13/004 365/148 |
| 2012/0275211 | A1* | 11/2012 | Yi .................... G11C 13/0023 365/148 |
| 2014/0172937 | A1* | 6/2014 | Linderman .......... G06N 3/0445 708/607 |
| 2015/0170025 | A1 | 6/2015 | Wu et al. |
| 2017/0178725 | A1* | 6/2017 | Yang ................... G11C 13/003 |
| 2018/0005110 | A1 | 1/2018 | Gokmen et al. |
| 2018/0046598 | A1* | 2/2018 | Le Gallo ............... G11C 13/04 |
| 2018/0075339 | A1 | 3/2018 | Ma et al. |
| 2018/0108403 | A1* | 4/2018 | Ge ..................... G11C 13/0069 |
| 2019/0066780 | A1* | 2/2019 | Hu ......................... G11C 11/56 |
| 2019/0189174 | A1* | 6/2019 | Hu ...................... G11C 11/1659 |
| 2020/0117700 | A1* | 4/2020 | Chatterjee ............... G06N 3/08 |
| 2020/0380384 | A1 | 12/2020 | Karunaratne et al. |
| 2020/0381048 | A1 | 12/2020 | Le Gallo-Bourdeau |

OTHER PUBLICATIONS

Li, et al., A Memristor Crossbar-Based Computation Scheme With High Precision, arXiv preprint arXiv: 1611.03264, Nov. 19, 2016, 6 pages URL: https://arxiv.org/pdf/1611.03264.pdf.

Hu, et al., Dot-Product Engine for Neuromorphic Computing: Programming 1T1M Crossbar to Accelerate Matrix-Vector Multiplication, Proceedings of the 53rd annual design automation conference. ACM, Mar. 3, 2016, 7 pages URL: https://www.labs.hpe.com/techreports/2016/HPE-2016-23.pdf.

Sharad, et al., Ultra Low Power Associative Computing With Spin Neurons and Resistive Crossbar Memory, Proceedings of the 50th Annual Design Automation Conference. ACM, 2013, 6 pages URL: https://arxiv.org/ftp/arxiv/papers/1304/1304.2281.pdf.

Li, et al., Hyperdimensional Computing With 3D VRRAM in-Memory Kernels: Device-Architecture Co-Design for Energy-Efficient, Error-Resilient Language Recognition, 2016 IEEE International Electron Devices Meeting (IEDM). IEEE, 2016, pp. 16.1.1-16.1.4.

Li, et al., Device-Architecture Co-Design for Huperdimensional Computing With 3D Vertical Resistive Switching Random Access Memory (3D VRRAM), 2017 International Symposium on VLSI Technology, Systems and Application (VLSI-TSA), IEEE, 2017, 2 pages.

Rahimi, et al., High-Dimensional Computing as a Nanoscalable Paradigm, IEEE Transactions on Circuits and Systems-I: Regular Papers, vol. 64, No. 9, Sep. 2017, pp. 2508-2521.

Wu et al., Brain-Inspired Computing Exploiting Carbon Nanotube FETS and Resistive RAM Hyperdimensional Computing Case Study, ISSCC 2018/Session 31/Computation in Memory for Machine Learning/31.3, pp. 491-493.

Montagna et al., "PULP-HD: Accelerating Brain-Inspired High-Dimensional Computing on a Parallel Ultra-Low Power Platform", Proceedings of the 55th Annual Design Automation Conference, DAC '18, 2018.

Paul J. Otterstedt, Feb. 23, 2021, pp. 1-2, List of IBM Patents or Patent Applications Treated as Related.

* cited by examiner

DEVICE FOR HIGH DIMENSIONAL COMPUTING COMPRISING AN ASSOCIATIVE MEMORY MODULE

BACKGROUND

The invention is notably directed to a device for high-dimensional computing comprising an associative memory module.

The invention further concerns a related method and a related computer program product.

Nanoscale memory devices, whose resistance depends on the history of the electric signals applied, could become critical building blocks in new computing paradigms, such as brain-inspired computing and memcomputing.

High-dimensional (HD) computing is a brain-inspired non von Neumann machine learning model based on representing information with high-dimensional vectors. HD computing is robust in the presence of device failures, defects, variations and noise, all of which are synonymous to ultra low energy computation on nanoscale fabrics such as computational phase-change memory (PCM). HD computing may be used for manipulating and comparing large patterns within the memory. A processor based on HD computing may be seen as an extremely wide dataflow processor with a small instruction set of bit-level operations.

One promising example for resistive memory devices are phase-change memory (PCM) devices. PCM is a non-volatile solid-state memory technology that exploits the reversible, thermally-assisted switching of phase-change materials, in particular chalcogenide compounds such as GST (Germanium-Antimony-Tellurium), between states with different electrical resistance. The fundamental storage unit (the "cell") can be programmed into a number of different states, or levels, which exhibit different resistance characteristics. The programmable cell-states can be used to represent different data values, permitting storage of information. Reading and writing of data in PCM cells is achieved by applying appropriate voltages to the phase-change material via a pair of electrodes associated with each cell. In a write operation, the resulting programming signal causes Joule heating of the phase-change material to an appropriate temperature to induce the desired cell-state on cooling. Reading of PCM cells is performed using cell resistance as a metric for cell-state. An applied read voltage causes current to flow through the cell, this current being dependent on resistance of the cell. Measurement of the cell current therefore provides an indication of the programmed cell state.

Accordingly, there is a need to provide improved devices for high dimensional computing.

SUMMARY

According to a first aspect, the invention is embodied as a device for high-dimensional computing comprising an associative memory module. The associative memory module comprises one or more planar crossbar arrays. The one or more planar crossbar arrays comprise a plurality of resistive memory elements. The device is configured to program profile vector elements of profile hypervectors as conductance states of the resistive memory elements and to apply query vector elements of query hypervectors as read voltages to the one or more crossbar arrays. The device is further configured to perform a distance computation between the profile hypervectors and the query hypervectors by measuring output current signals of the one or more crossbar arrays.

Such a device allows to perform high-dimensional computing with planar, i.e. 2-dimensional crossbar arrays in an elegant and efficient way. Furthermore, such planar crossbar arrays for high-dimensional computing may be fabricated and operated in an efficient way.

According to an embodiment, one or more crossbar arrays comprise a plurality of row lines, a plurality of column lines and a plurality of junctions arranged between the plurality of row lines and the plurality of column lines. Each junction comprises a resistive memory element. The device comprises further a signal generator configured to apply programming signals to the resistive memory elements to program the profile hypervectors as conductance states of the resistive memory elements. In addition, a readout circuit is provided which is configured to apply the read voltages of the query vector elements to the row lines of the crossbar array and read out the output current signals from the column lines of the crossbar array.

According to a further embodiment, each junction comprises a serial arrangement of the resistive element and an access element comprising an access terminal for accessing the resistive element.

Such embodiments allow to perform high-dimensional computing in an efficient way.

According to an embodiment, the device may be configured to perform the distance computation as Hamming distance computation between binary vectors. Such an embodiment may be e.g. implemented by configuring the device to program the profile vector elements of the profile hypervectors as binary conductance states at a first set of locations of the one or more crossbar arrays and to program complement profile vector elements of the complements of the profile hypervectors as binary conductance states at a second set of locations of the one or more crossbar arrays. Furthermore, the device may be configured to apply the query vector elements as read voltages to the profile vector elements at the first set of locations, to apply the complements of the query vector elements as read voltages to the complement profile vector elements at the second set of locations and to perform the distance computation as a summation of the current signals of the profile vector elements and of the current signals of the complement profile vector elements.

Such a distance computation as Hamming distance computation provides advantages in terms of accuracy.

According to an embodiment, the device is configured to perform the distance computation as binary dot-product computation. For this, the device may be configured to encode the profile vector elements of the profile hypervectors as binary conductance states, to apply the query vector elements of the query hypervectors as binary read voltage values to the one or more crossbar arrays and to compute results of the distance computation by an analog summation of current signals of the resistive elements of column lines of the one or more crossbar arrays. Accordingly, each column line comprises a result of a distance computation between a query hypervector and a profile hypervector.

Such a distance computation by means of dot product computation is advantageous in terms of area and energy consumption. As an example, it needs 2 times less area and energy than a distance computation by means of the Hamming distance.

According to some embodiments, the first set of locations and the second set of locations may be arranged on the same crossbar array, while according to other embodiments the first set of locations and the second set of locations may be arranged on separate crossbar arrays.

According to an embodiment, the device is configured to decompose the profile hypervectors into a plurality of sub-profile hypervectors and to decompose the query hypervectors into a plurality of sub-query hypervectors. The device is further configured to program the plurality of sub-hypervectors at different positions of the crossbar arrays, to apply the query sub-vectors individually to the corresponding profile sub-vectors, to measure a corresponding sub-vector current and to add the sub-vector currents.

Such a decomposition may be implemented to minimize the effect of spatial device variability at randomly chosen positions.

According to some embodiments, the device may encode the query vector elements by the amplitude of the voltage pulses, while according to other embodiments the device may encode the query vector elements by the duration of voltage pulses.

According to an embodiment of another aspect of the invention a method for operating a device for high-dimensional computing according to the first aspect is provided. The method comprises a step of programming profile vector elements of profile hypervectors as conductance states of the resistive memory elements and a step of applying query vector elements of query hypervectors as read voltages to the one or more crossbar arrays. A further step comprises performing a distance computation between the profile hypervectors and the query hypervectors by measuring output current signals of the one or more crossbar arrays.

According to an embodiment of another aspect of the invention, a computer program product for operating a device for high-dimensional computing according to the first aspect is provided. The computer program product comprises a computer readable storage medium having program instructions embodied therewith. The program instructions are executable by a control unit of the device to cause the control unit to perform a method comprising programming profile vector elements of profile hypervectors as conductance states of the resistive memory elements, applying query vector elements of query hypervectors as read voltages to the one or more crossbar arrays and performing a distance computation between the profile hypervectors and the query hypervectors by measuring output current signals of the one or more crossbar arrays.

Embodiments of the invention will be described in more detail below, by way of illustrative and non-limiting examples, with reference to the accompanying drawings.

DETAILED DESCRIPTION

Figure 1:
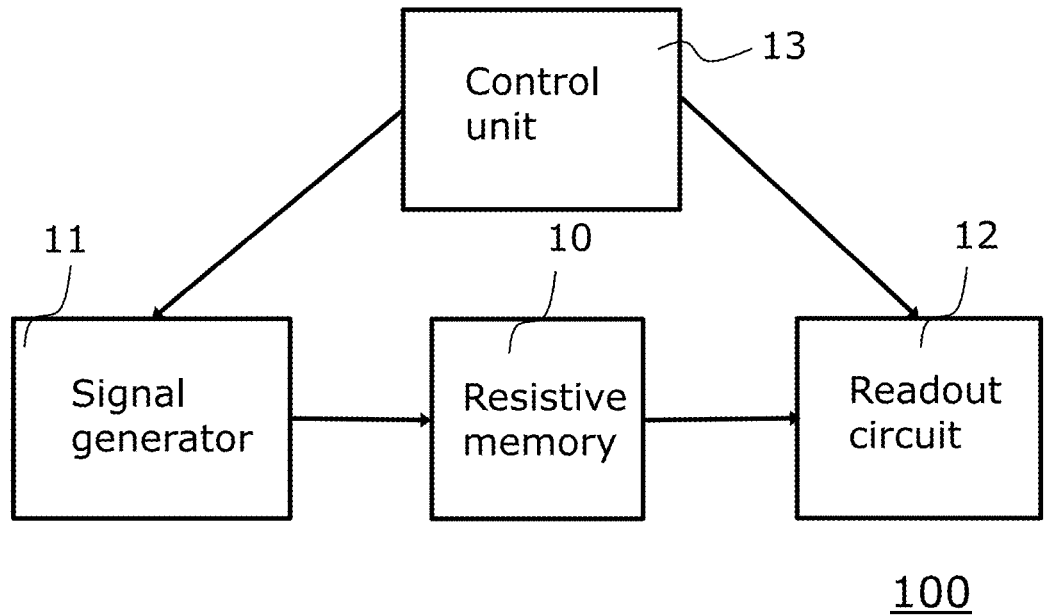
FIG. 1 is a simplified schematic block diagram of a device for performing high dimensional computing according to an embodiment of the invention.

In reference to FIGS. 1-10, some general aspects and terms of embodiments of the invention are described.

High-dimensional (HD) computing is a brain-inspired non von Neumann machine learning model based on representing information with high-dimensional vectors. A processor based on HD computing may be seen as an extremely wide dataflow processor with a small instruction set of bit-level operations.

High-dimensional computing represents information by projecting data onto vectors in a high-dimensional space. HD vectors may be in particular embodied holographic and (pseudo)random with independent and identically distributed (i.i.d.) components. High-dimensional computing may also be denoted as hyperdimensional computing. High-dimensional vectors may also be denoted as hypervectors. According to embodiments, the high-dimensional vectors/hypervectors may have dimensions of more than 100 elements, of more than 1000 elements or of more than 10000 elements.

An associative memory module may be defined as a memory module which is configured to compare input data, in particular query hypervectors, with data stored in the associative memory module, in particular with stored profile hypervectors. An associative memory module may be also denoted as content-addressable memory (CAM) or as associative storage.

For learning and inference tasks, a device for high-dimensional computing may comprise a module for performing a random projection to the HD space, an encoding module and an associative memory module. The first two modules may utilize random indexing with Multiply-Add-Permute (MAP) operations that allow a high degree of parallelism by needing to communicate with only a local component or its immediate neighbors. In the associative memory module, the distance computation may be performed in a distributed fashion.

According to embodiments of the invention, a resistive element may be defined as an element which comprises a resistive material and whose electrical resistance can be changed by applying an electrical programming signal to the resistive element. The resistive element may be in particular embodied as resistive memory element. The electrical programming signal may be e.g. a current flowing through the resistive memory element, or an electrical voltage applied to the resistive memory element. The current and/or voltage may be e.g. applied to the resistive memory element in the form of pulses. As a result, the electrical resistance of a resistive memory element depends on the history of current that had previously flown through the memory element and/or the history of the electric signal that had been applied to the resistive memory element.

Resistive memory elements are based on a physical phenomenon occurring in a material that changes its resistance under action of a current or electric field. The change is usually non-volatile and reversible. Several classes of resistive memory elements are known, ranging from metal oxides to chalcogenides. Typical resistive memory elements are metal/insulator/metal structures where the metallic components serve as the electrodes and the insulator is a resistive switching material, e.g. a chalcogenide. These resistive memory elements exhibit good performance in terms of power consumption, integration density potential, retention, and endurance.

Embodiments of the invention may bring significant power and/or speed advantages compared to conventional von-Neumann approaches.

FIG. 1 is a simplified schematic block diagram of an associative memory module 100 according to an embodiment of the invention. The associative memory module 100 comprises a resistive memory 10 having a plurality of resistive memory elements. Furthermore, a signal generator 11 is provided. The signal generator 11 is configured to apply electrical programming signals to the resistive memory elements of the resistive memory 10. The signal generator 11 comprises circuitry for programming the resistive memory cells during data write or programming operations. According to embodiments, the associative memory module 100 may be a memcomputing device configured to perform computations, in particular distance computations. The distance computations may be in particular performed by performing matrix-vector multiplications of a matrix with a vector. According to such an embodiment, the signal generator 11 is configured to receive a matrix A comprising a plurality of profile vector elements as input and to apply programming signals to the memory elements to program the profile vector elements as conductance values of the resistive memory elements. Hence the matrix A may represent profile vector elements of profile hypervectors as conductance states.

In addition, the memory device 100 comprises a readout circuit 12 configured to read out resistance values of the resistive memory elements during data read operations. The readout circuit 12 may be in particular configured to apply read out voltages to the rows of a memory crossbar array. The read out voltages may represent in particular query vector elements of query hypervectors that shall be multiplied with the matrix. The device is further configured to read out current values of columns of the memory array. Each of the current values corresponds to a distance computation between the query hypervector and the respective profile hypervector.

The device 100 further comprises a control unit 13 configured to control the signal generator 11 and the readout circuit 12.

The resistive memory 10 may be generally any kind of resistive memory as described above. According to embodiments, it may be a phase change memory (PCM) comprising phase-change memory elements, a conductive bridge random access memory (CBRAM), a metal-oxide resistive random access memory (RRAM), a magneto-resistive random access memory (MRAM), a ferroelectric random access memory (FeRAM) or an optical memory. According to another embodiment it may be a system memory comprising system elements. The system elements may comprise e.g. a plurality of transistors, resistors, capacitors, and/or inductors which are configured to jointly emulate a behavior of a resistive element.

In the following it is assumed that the resistive memory 10 is embodied as PCM. Accordingly the resistive memory 10 comprises a plurality of PCM cells as resistive memory elements. The PCM cells of resistive memory 10 may comprise a plurality of programmable resistance states. The plurality of programmable resistance-states correspond to different relative proportions of the amorphous and crystalline phases within the PCM material of the cell. These states may include a high-resistance, fully-amorphous RESET state, a low-resistance, fully-crystalline SET state, and a number of intermediate states corresponding to increasing size of the crystalline phase within the otherwise amorphous PCM material. The programmable cell-states are typically defined in terms of predetermined reference values, or ranges of values, of the resistance metric used for read detection by the readout circuit 12.

Figure 2:
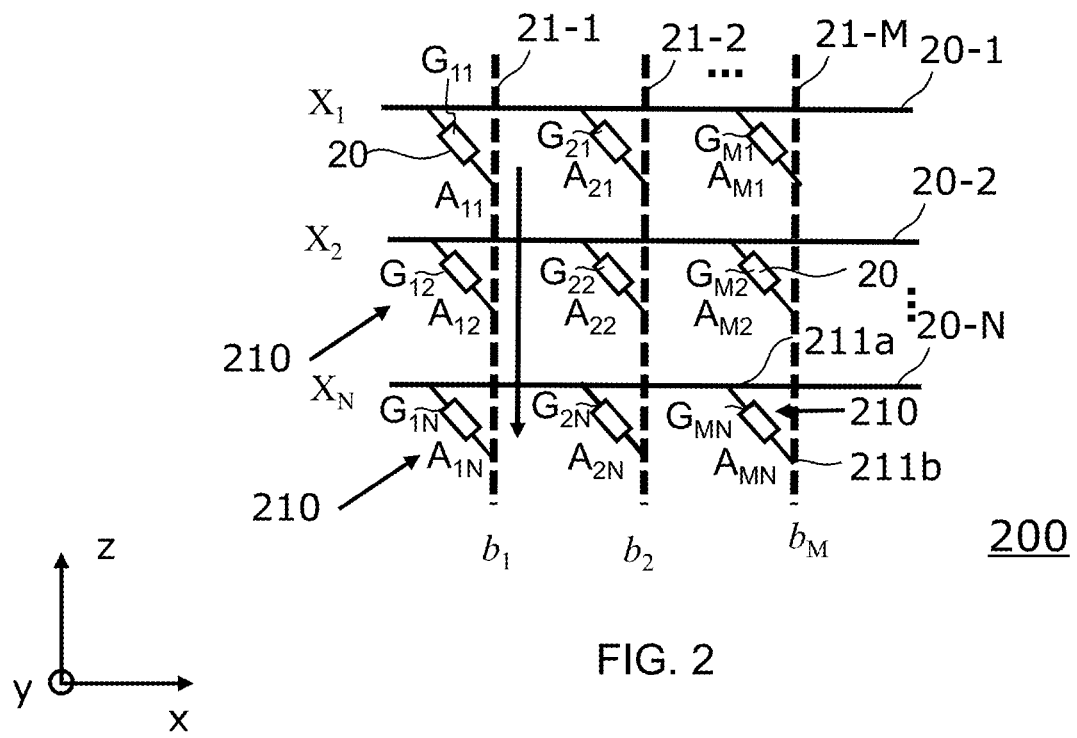
FIG. 2 illustrates an example of a distance computation according to an embodiment of the invention.

FIG. 2 illustrates an example of a distance computation according to an embodiment of the invention. The distance computation uses Ohm's law and Kirchhoff's law in a resistive crossbar array 200.

The crossbar array 200 comprises a plurality of N row lines 20-1, 20-2, . . . 20-N and a plurality of M column lines 21-1, 21-2, . . . , 21-M. The N row lines are arranged above the M column lines which are indicated by dotted lines. More particularly, the row lines extend in a first x-y-plane and the column lines extend in a second x-y plane, wherein the first x-y plane is arranged in the vertical z-direction above the second x-y-plane.

The row lines and the column lines are connected to each other via vertical junctions 210. The junctions 210 extend in the vertical z-direction between upper cross points 211a of the row lines and lower cross points 211b of the column lines. Each junction 210 comprises a serial arrangement of a resistive memory element and a transistor. For ease of illustration, the transistors are not shown in FIG. 2.

More particularly, the crossbar array 200 comprises resistive elements 20 embodied as PCM cells. The column line 21-1 comprises resistive elements $G_{11}$, $G_{12}$, . . . , $G_{1N}$, the column line 21-2 comprises the resistive elements $G_{21}$, $G_{22}$, . . . , $G_{2N}$ and the column line 21-M the resistive elements $G_{M1}$, $G_{M2}$, . . . , $G_{MN}$.

In order to perform the distance computation, the signal generator 11 applies programming signals, in particular current pulses, to the resistive elements and thereby programs the conductance values of profile vector elements of profile hypervectors.

Accordingly, the conductance of the resistive memory element $G_{11}$ is programmed to a conductance value $G_{11}$, the conductance of the resistive memory element $G_{12}$ is programmed to the conductance value $G_{12}$, or more generally the conductance of the resistive memory element Gij is programmed to a corresponding conductance value Gij.

The conductance values $G_{11}$, $G_{12}$, . . . , $G_{1N}$ form a first profile hypervector, the conductance values $G_{21}$, $G_{22}$, . . . , $G_{2N}$ form a second profile hypervector and the conductance values $G_{M1}$, $G_{m2}$, . . . , $G_{MN}$ form an M-th profile hypervector.

In order to compute a distance between a query hypervector X and the M profile hypervectors, the readout circuit 12 applies read voltages to the row lines 20-1, 20-2, . . . , 20-N. More particularly, the readout circuit 12 applies a read voltage $X_1$ to the row line 20-1, a read voltage $X_2$ to the row line 20-2 and a read voltage $X_N$ to the row line 20-N.

Furthermore, the readout circuit 12 reads out current values of the column lines 21-1, 21-2, . . . 21-M. As an example, the readout circuit 12 reads out a current value $b_1$ from the column line 21-1, which is the sum of $$b_1 = G_{11}x_1 + G_{12}x_2 + \ldots + G_{1N}x_N.$$

Accordingly, the readout circuit 12 reads out a current value $b_2$ from the column line 21-2 and a current value $b_M$ from the column line 21-M. The current values represent the result values of the respective distance computation.

Figure 3:
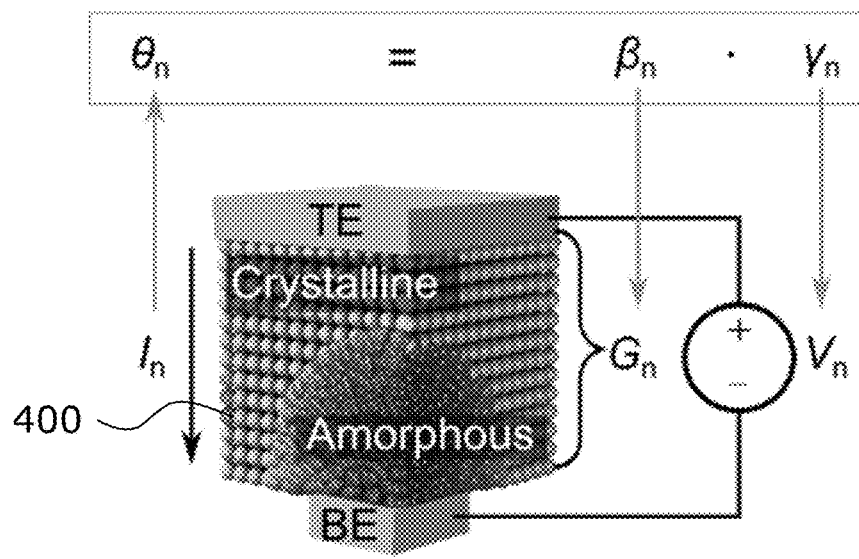
FIG. 3 illustrates an exemplary embodiment of a scalar multiplication that may be performed by a PCM cell.

FIG. 3 illustrates an exemplary embodiment of a scalar multiplication that may be performed by a PCM cell 300. Such a scalar multiplication forms the basis of the matrix-vector multiplication performed according to embodiments of the invention. Let $\theta_n = \beta_n \gamma_n$, where $\beta_n$ and $\gamma_n$ are numbers generated uniformly in [0,1]. $\beta_n$ is mapped to an effective conductance $G_n$, and $\gamma_n$ to a voltage $V_n$. As the current in the PCM cell 300 is a slightly non-linear function of the voltage, the analogue scalar multiplication may be expressed to follow a "pseudo" OHM's law, namely by $$I_n \approx \alpha G_n \cdot f(V_n).$$

In this equation, $\alpha$ is a time dependent conductance variation parameter and f a function, in particular a polynomial function that approximates the current-voltage characteristics of the PCM cell 300. The individual PCM cell 300 may be programmed to the effective conductance $G_n$ by single shot programming or an iterative program and verify procedure. Then the readout circuit 12 may apply a read voltage $V_n$ and readout the current $I_n$. Finally, the current $I_n$ is converted back to approximate the value $\theta_n$, representing the result of the scalar multiplication.

Figure 4:
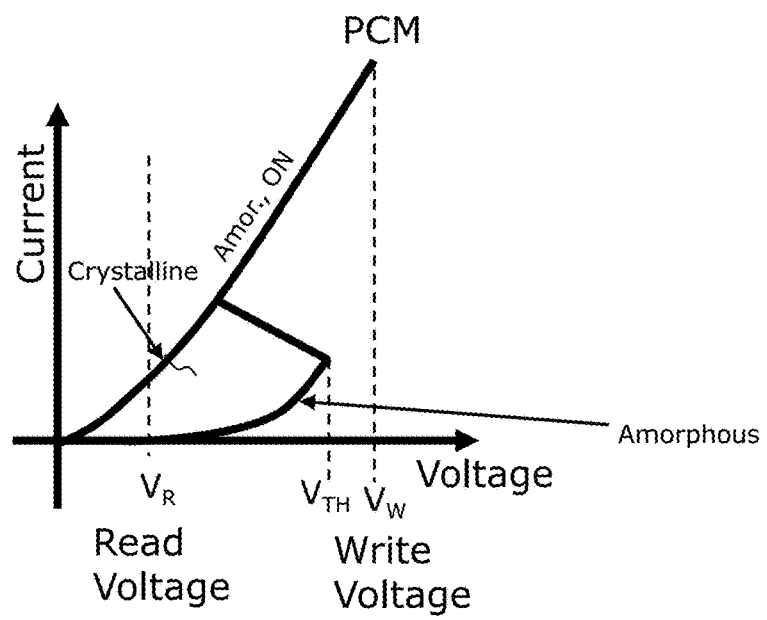
FIG. 4 is a schematic illustration of the current/voltage (and hence resistance) characteristics of the material components of a memory cell.

FIG. 4 is a schematic illustration of the current/voltage (and hence resistance) characteristics of the material components of the memory cell 300 of FIG. 3. The solid lines indicate variation of current with voltage for the PCM material, starting from the fully-crystalline SET state (upper curve) and also the fully-amorphous RESET state (lower curve). These two curves reflect the large (typically 3 orders of magnitude) variation in resistivity between the crystalline and amorphous phases. The amorphous phase exhibits a non-linear characteristic with a threshold switching phenomenon that is field induced. At a certain threshold voltage $V_{TH}$, this phase switches to a very low "ON-state" resistance corresponding to that of the crystalline PCM material. The cell programming (write) voltage is selected to be above this threshold voltage as indicated.

Figure 5:
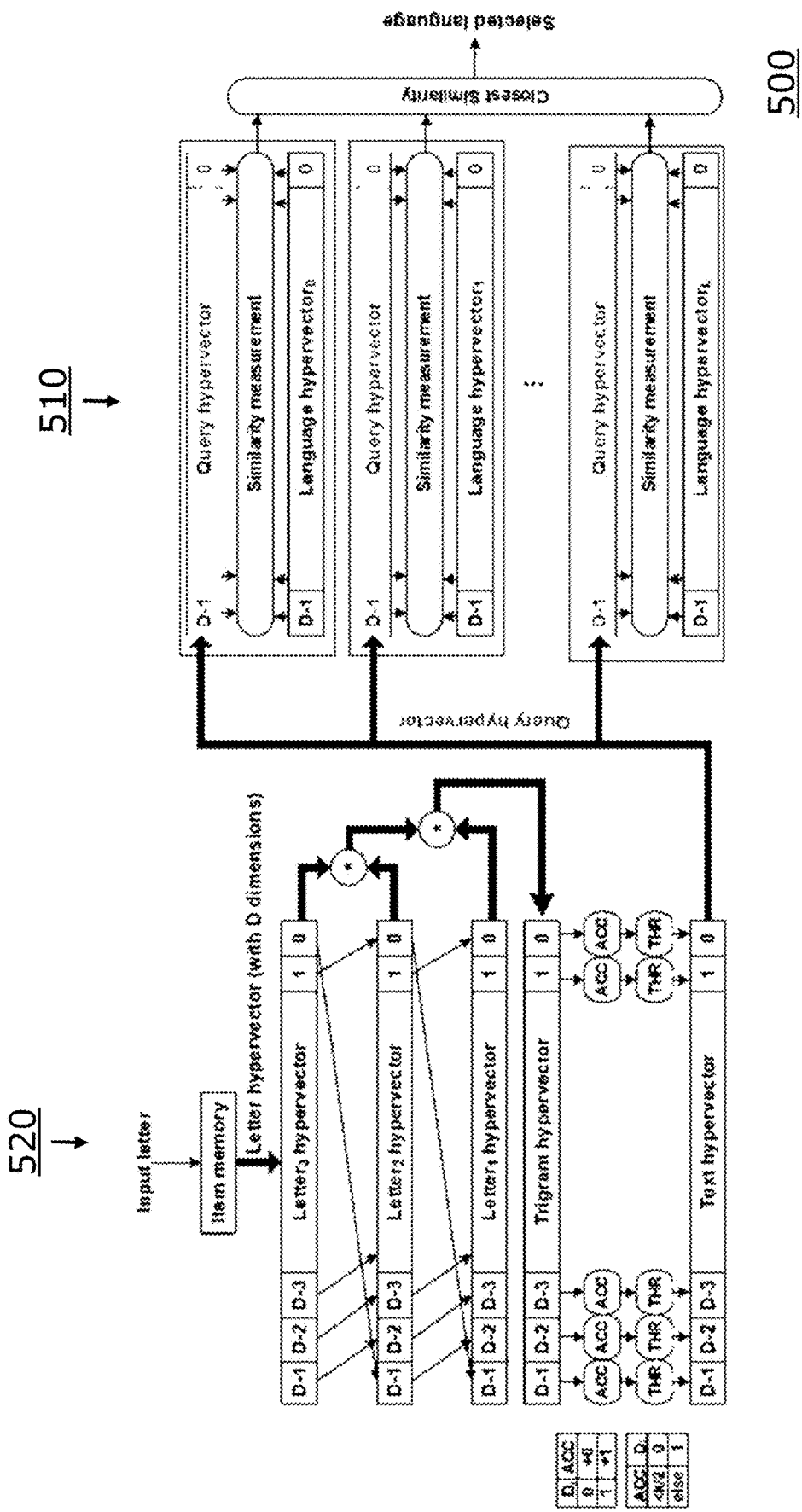
FIG. 5 shows a device for high-dimensional computing.

FIG. 5 shows a device 500 for high-dimensional computing. In this example it is a device for recognizing a language of an input text.

The device 500 comprises an associative memory module 510 for distance computation and an encoding module 520

The associative memory module 510 is configured to store profile hypervectors which have been computed during a training phase of the device 500. During an inference phase the device 500 performs a similarity measurement by means of a distance computation between query hypervectors and the profile hypervectors. More particularly, the query hypervectors are computed by the encoding module 520 and then submitted as input voltages to the associative memory module 510. As an example, the query hypervectors may be text hypervectors formed by bundling trigram hypervectors and the profile hypervectors may be representative hypervectors of languages. The task of the associative memory module is then to determine which class (e.g. language) the query hypervector belongs to.

Figure 6:
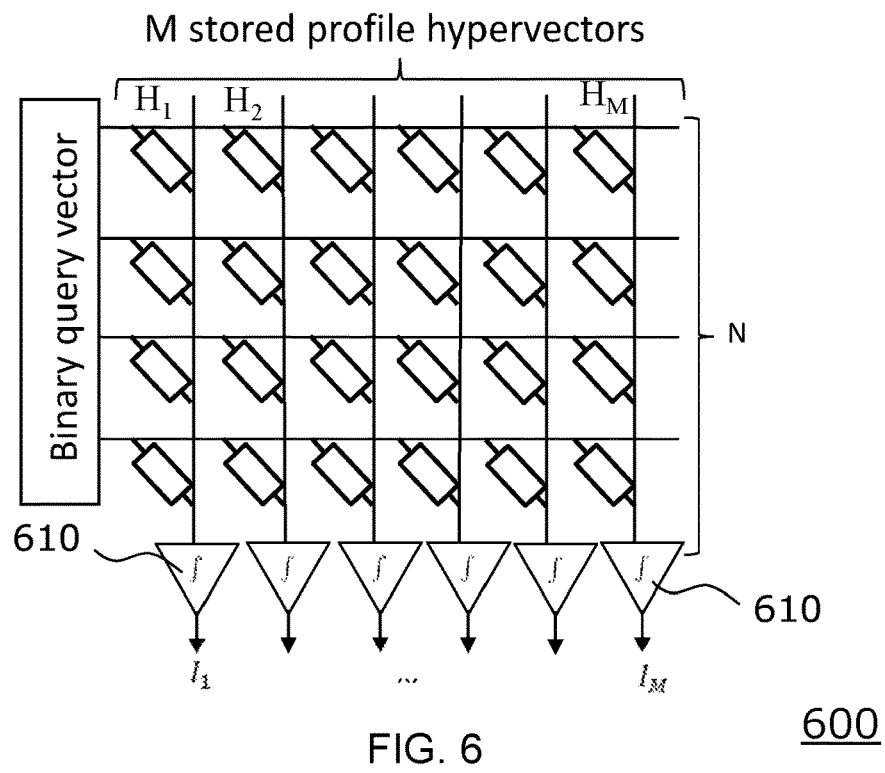
FIG. 6 shows a crossbar array configured to perform a distance computation as binary dot-product computation.

FIG. 6 shows a crossbar array 600 configured to perform a distance computation as binary dot-product computation. The crossbar array 600 comprises M columns and N rows of resistive elements. Each of the M columns represents a profile hypervector $H_1, H_2, \ldots H_M$ comprising N resistive elements. The N resistive elements of the M profile hypervectors encode the profile vector elements of the profile hypervectors as binary conductance states. In order to perform a distance computation, binary read voltages may be applied as binary query vector elements to the crossbar array 600. The results of the distance computation may then be derived by an analog summation of the current signals of the resistive elements of each of the M columns of the crossbar array 600. More particularly, each of the M column lines of the crossbar array 600 comprises an integrator 610 which integrates the current signals at the respective column outputs of the column lines. As a result M output currents $I_1, I_2, \ldots I_M$ are measured at the output of the column lines. The measured output currents $I_i$ represent the respective distance between the applied query hypervector and the respective i-th profile hypervector. As an example, the output current $I_1$ represents the distance between the applied query hypervector and the profile hypervector $H_1$.

Figure 7:
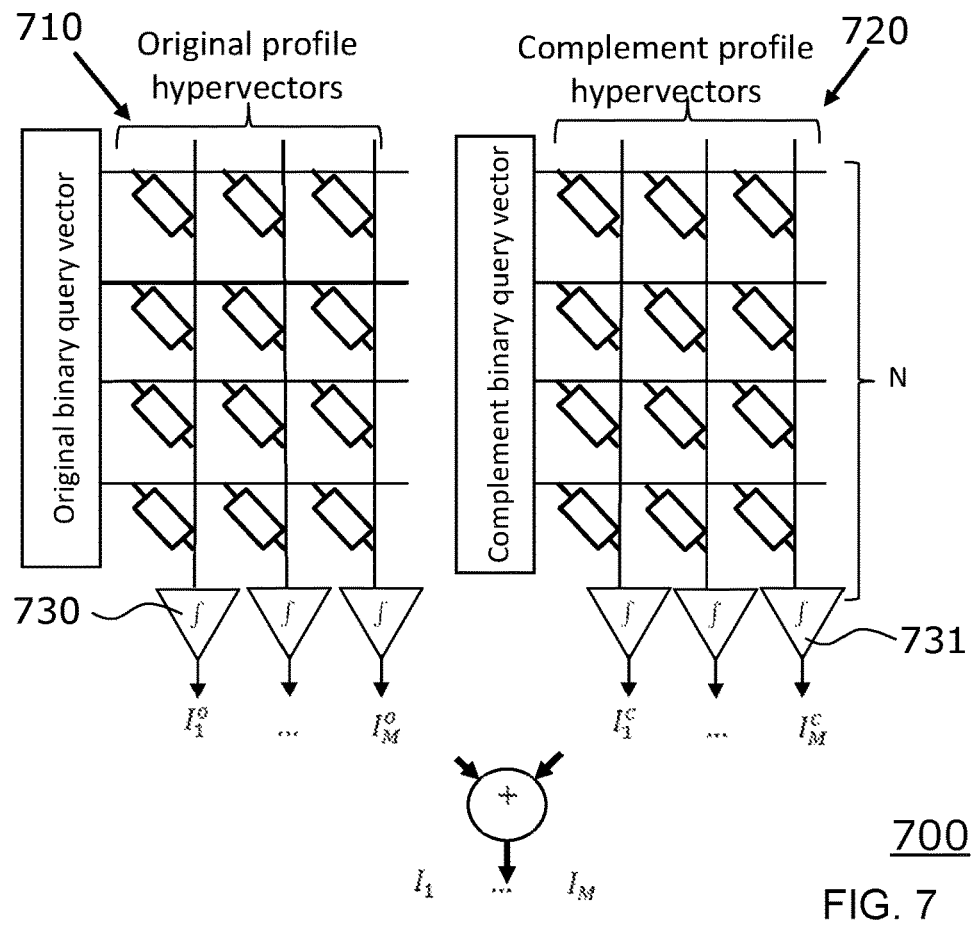
FIG. 7 shows an associative memory module configured to perform a distance computation as Hamming distance computation.

FIG. 7 shows an associative memory module 700 comprising a first crossbar array 710 and a second crossbar array 720. The associative memory module 700 is configured to perform a distance computation as Hamming distance computation.

The first crossbar array 710 and the second crossbar array 720 each comprises M columns and N rows of resistive elements. Each of the M columns represent a profile hypervector comprising N resistive elements. According to this embodiment, the profile vector elements of the profile hypervectors are programmed as binary conductance states in the first crossbar array 710. The profile hypervectors may also be denoted as original profile hypervectors. The first crossbar array 710 forms a first set of locations for the storage of the original profile hypervectors. In addition, complement profile vector elements of the complements of the profile hypervectors are programmed as binary conductance states in the second crossbar array 720. Accordingly, the second crossbar array 720 forms a second set of locations for the storage of the complement profile hypervectors. The distance computation may then be performed as follows:

The original query vector elements are applied as read voltages to the profile vector elements stored in the first crossbar array 710. In addition, the complements of the query vector elements are applied as read voltages to the complement profile vector elements stored in the second crossbar array 720. The results of the distance computation are then derived by a summation of the combined output current signals of the profile vector elements and of the combined output current signals of the corresponding complement profile vector elements. More particularly, each of the M column lines of the first crossbar array 710 comprises an integrator 730 which integrates the current signals at the respective column outputs of the column lines. Furthermore, each of the M column lines of the second crossbar array 720 comprises an integrator 731 which integrates the current signals at the respective column outputs of the column lines. As a result, M output current signals $$I_1^O, \ldots, I_M^O$$

are measured at the output of the column lines of the first crossbar array 710 and M output current signals $$I_1^C, \ldots, I_M^C$$

are measured at the output of the column lines of the second crossbar array 720.

Each of the output signals of the first crossbar array 710 is then added to the corresponding output signal of the second crossbar array 720, resulting in combined output signals $$I_1, \ldots, I_M,$$

which represent the respective distances.

Figure 8:
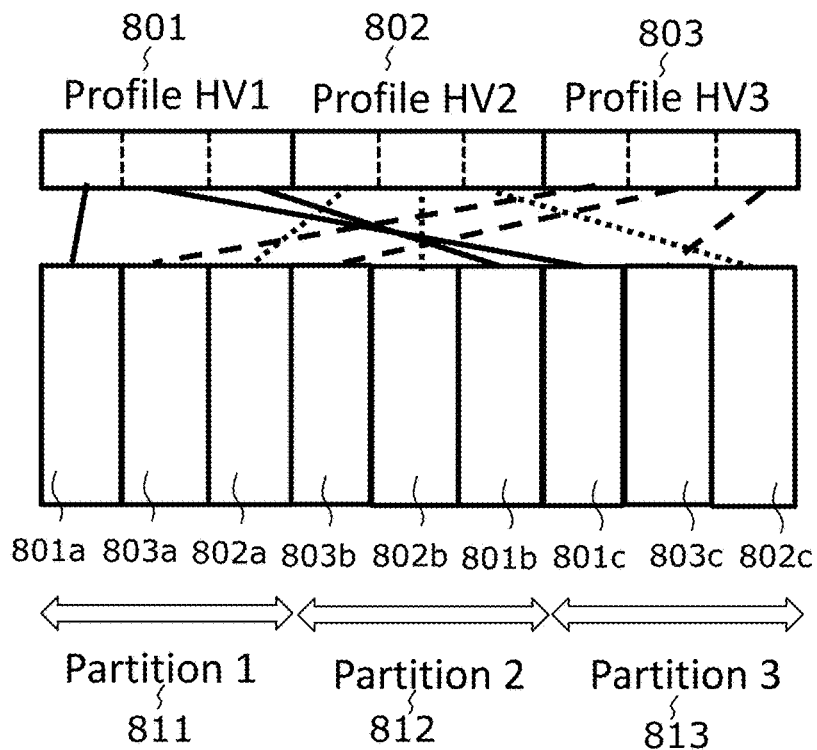
FIG. 8 shows a mapping of profile hypervectors on several partitions according to an embodiment of the invention.

FIG. 8 shows a mapping of profile hypervectors 801, 802 and 803 on partitions 811, 812 and 813 according to an embodiment of the invention. The profile hypervectors are decomposed into a plurality of sub-profile hypervectors of equal size, in this example into the sub-profile hypervectors 801a, 801b, 801c, 802a, 802b, 802c, 803a, 803b and 803c.

Then the plurality of sub-hypervectors are programmed at different positions of the crossbar arrays. More particularly, the sub-profile hypervectors of each profile hypervector are distributed in a randomly permuted order over the three partitions 811, 812 and 813. As an example, the first sub-profile hypervector 801a of the profile hypervector 801 is programmed to a first part of the partition 811, the second sub-profile hypervector 801b of the profile hypervector 801 is programmed to a third part of the partition 812 and the third sub-profile hypervector 801c of the profile hypervector 801 is programmed to a first part of the partition 813. In general, the profile hypervectors may be decomposed into a number of P sub-profile hypervectors and a corresponding number of P partitions may be created in the one or more crossbar arrays, wherein P is an integer ≥2. The mapping of the profile hypervector 801 is illustrated with a solid line, the mapping of the profile hypervector 802 is illustrated with a dotted line and the mapping of the profile hypervector 803 is illustrated with a dashed line.

Figure 9:
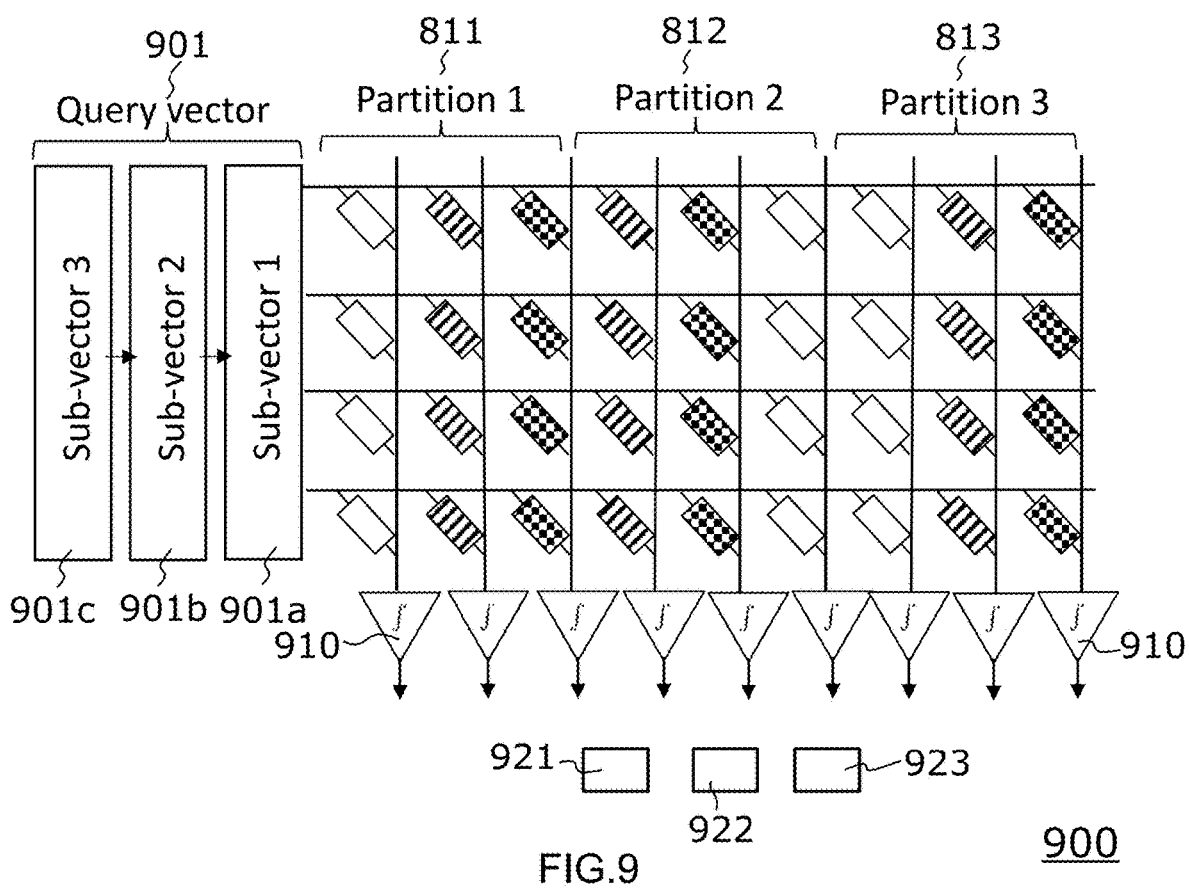
FIG. 9 shows a crossbar array corresponding to the mapping profile of FIG. 8.

FIG. 9 shows a crossbar array 900 corresponding to the mapping profile of FIG. 8. The sub-profile hypervectors are stored in respective column lines of the crossbar array 900. The resistive elements of the sub-profile hypervectors 801a, 801b and 801c are illustrated with a white resistor, the resistive elements of the sub-profile hypervectors 802a, 802b and 802c are illustrated with diagonally patterned resistors and the resistive elements of the sub-profile hypervectors 803a, 803b and 803c are illustrated with checkerboard resistors. A query hypervector 901 is decomposed in three sub-query hypervectors 901a, 901b and 901c. Each of the column lines of the crossbar array 900 comprises an integrator 910 for integrating the output currents of the respective column lines. The query sub-vectors 901a, 901b and 901c are applied individually to the corresponding profile sub-vectors and by means of the integrators 910 a corresponding sub-vector current is measured. As an example, at a first step the first sub-query hypervector 901a is applied to the first partition 801, more particularly to the row lines of the first partition 811 of the crossbar array 900. At this first step, the sub-vector currents at the output of the column lines of the first partition are measured by the integrators 910 and forwarded to output buffers 921, 922 and 923. The output buffer 921 is allocated to the sub-vector currents of the first profile hypervector 801, the output buffer 922 is allocated to the sub-vector currents of the second profile hypervector 802 and the output buffer 923 is allocated to the sub-vector currents of the third profile hypervector 803. The results/output currents of the other partitions 812 and 813 are discarded at this first step.

At a second step, the second sub-query hypervector 901b is applied to the second partition 812, more particularly to the row lines of the second partition 812. At this second step, sub-vector currents at the output of the column lines of the second partition are measured by the integrators 910 and forwarded to the corresponding output buffers 921, 922 and 923 respectively, while the results/output currents of the other partitions 811 and 813 are discarded.

Then, at a third step, the third sub-query hypervector 901c is applied to the third partition 813, more particularly to the row lines of the third partition 813. At this third step, the sub-vector currents at the output of the column lines of the third partition are measured by the integrators 910 and forwarded to the output buffers 921, 922 and 923 respectively, while the results/output currents of the other partitions 811 and 812 are discarded.

Finally, the sub-vector currents which have been stored in the output buffers 921, 922 and 923 are added. According to embodiments, intermediate additions of the results of the first step and the results of the second step may have been performed beforehand. The profile hypervector which provides the maximum sum output current has the closest similarity to the applied query hypervector.

The mapping scheme as described above with reference to FIG. 8 and FIG. 9 reduces or even minimizes the effect of spatial device variability of the crossbar array(s).

Figure 10:
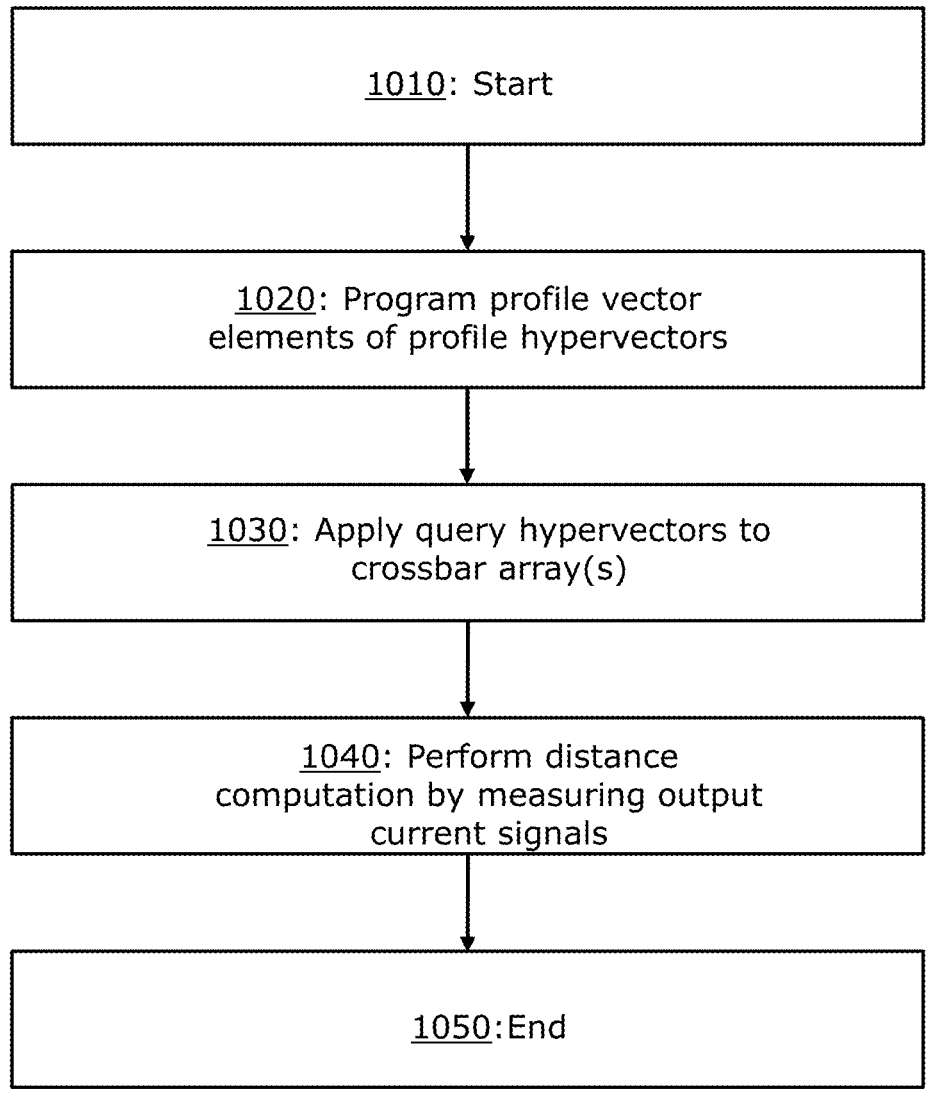
FIG. 10 shows a flow chart of methods step of a method for operating a device according to an embodiment of the invention.

FIG. 10 shows a flow chart of methods step of a method for operating a device for high-dimensional computing comprising an associative memory module according to an embodiment of the invention, e.g. of the device 100 of FIG. 1. The method steps may be e.g. performed by a computer program that runs in the control unit 13 of the device 100.

At a step 1010, the method starts.

At a step 1020, the control unit 13 programs profile vector elements of profile hypervectors as conductance states of the resistive memory elements.

At a step 1030, the control unit 13 applies query vector elements of query hypervectors as read voltages to the one or more crossbar arrays.

At a step 1040, the control unit 13 performs a distance computation between the profile hypervectors and the query hypervectors by measuring output current signals of the one or more crossbar arrays.

At a step 1050, the method ends.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In general, modifications described for one embodiment may be applied to another embodiment as appropriate.

What is claimed is:

1. A method for high-dimensional computing comprising:
    programming profile vector elements of a plurality of profile hypervectors as conductance states of a plurality of resistive memory elements in a plurality of crossbar arrays, wherein the profile vector elements of respective ones of the profile hypervectors are programmed in different ones of the crossbar arrays;
    applying query vector elements of a query hypervector as read voltages to the profile vector elements programmed in the crossbar arrays;
    performing a distance computation between each of the profile hypervectors and the query hypervector by measuring output current signals output by the crossbar arrays upon the application of the query vector elements; and
    making a selection based on the distance computation.

2. A computer program product for high-dimensional computing, the computer program product comprising a computer readable storage medium having program instructions embodied therewith, the program instructions executable by a control unit to perform a method comprising:
    programming profile vector elements of a plurality of profile hypervectors as conductance states of a plurality of resistive memory elements in a plurality of crossbar arrays, wherein the profile vector elements of respective ones of the profile hypervectors are programmed in different ones of the crossbar arrays;

applying query vector elements of a query hypervector as read voltages to the profile vector elements programmed in the crossbar arrays;

performing a distance computation between each of the profile hypervectors and the query hypervector by measuring output current signals output by the crossbar arrays upon the application of the query vector elements; and making a selection based on the distance computation.

3. A high-dimensional computing device comprising:

an associative memory module comprising at least two crossbar arrays configured to store respective profile hypervectors; and an encoding module configured to receive an input, determining a query hypervector based on the input, and apply the query hypervector to each of the at least two crossbar arrays, wherein the associative memory module is configured to determine, according to a distance computation and a based on an application of the query hypervector to each of the at least two crossbar arrays, which of the profile hypervectors is most similar to the query hypervector.

4. The high-dimensional computing device of claim 3, wherein each of the at least two crossbar arrays comprises a plurality of first lines, a plurality of second lines connected to the plurality of first lines by a plurality of resistive memory elements.

5. The high-dimensional computing device of claim 4, further comprising at least one signal generator configured to program the plurality of resistive memory elements, via the plurality of first lines, with conductance values corresponding to profile vector elements of the profile hypervectors.

6. The high-dimensional computing device of claim 5, wherein the encoding module comprises a readout circuit configured to apply, via the plurality of first lines, query vector elements of the query hypervector as read voltages to the plurality of resistive memory elements.

7. The high-dimensional computing device of claim 6, wherein the associative memory module comprises a plurality of integrators configured to perform the distance computation between the profile vector elements and the query vector elements by integrating current signals associated with the profile vector elements output on respective ones of the plurality of second lines.

8. The high-dimensional computing device of claim 4, further comprising a plurality of junctions arranged between the plurality of first lines and the plurality of second lines, wherein each junction comprises one of the resistive memory elements.

9. The high-dimensional computing device according to claim 8, wherein each of the junctions of the plurality of junctions comprises a serial arrangement of a respective one of the resistive memory elements and an access element comprising an access terminal for accessing the respective one of the resistive memory elements.

10. The high-dimensional computing device according to claim 3, wherein the distance computation is a binary dot-product computation.

11. The high-dimensional computing device according to claim 5, wherein:

the profile vector elements of the profile hypervectors are encoded in the plurality of resistive memory elements as binary conductance states; and the query vector elements of the query hypervector are applied to the plurality of resistive memory elements as binary read voltage values.

12. The high-dimensional computing device according to claim 7, wherein the high-dimensional computing device is configured to:

decompose the profile hypervectors into a plurality of sub-profile hypervectors;

decompose the query hypervector into a plurality of sub-query hypervectors;

wherein the signal generator is further configured to program the profile vector elements of the plurality of sub-profile hypervectors at different positions of the at least two crossbar arrays;

wherein the readout circuit is further configured to apply the sub-query vector elements of the plurality of sub-query hypervectors individually to corresponding ones of the profile vector elements of the plurality of sub-profile hypervectors; and wherein the integrators are further configured to measure a corresponding sub-vector current signal output on each of the second lines in response to the application of the plurality of sub-query hypervectors.

13. The high-dimensional computing device according to claim 3, wherein the high-dimensional computing device is configured to:

decompose the profile hypervectors into a number of P sub-profile hypervectors, wherein P is an integer >2;

decompose the query hypervector into the number of P sub-query hypervectors;

create a number of P partitions in at least one of the at least two crossbar arrays;

map the sub-profile hypervectors to the partitions in a randomly permuted order; and program the sub-profile hypervectors.

14. The high-dimensional computing device according to claim 5, wherein the conductance values are multi-level conductance states.

15. The high-dimensional computing device according to 6, wherein the high-dimensional computing device is configured to encode the query vector elements by an amplitude or a duration of voltage pulses.

16. The high-dimensional computing device according to claim 5, wherein the high-dimensional computing device is configured to program the conductance values by single shot programming.

17. The high-dimensional computing device according to claim 5, wherein the high-dimensional computing device is configured to program the conductance values by an iterative programming scheme.

18. The high-dimensional computing device according to claim 4, wherein the resistive memory elements are selected from a group consisting of: phase-change memory elements, conductive bridge random access memory elements (CBRAM), metal-oxide resistive random access memory elements (RRAM), magneto-resistive random access memory elements (MRAM), ferroelectric random access memory elements (FeRAM) and optical memory elements.

19. The high-dimensional computing device according to claim 4, wherein the resistive memory elements are embodied as system elements, the system elements comprising a plurality of transistors, resistors, capacitors, and/or inductors, the plurality of transistors, resistors, capacitors, and/or inductors being configured to jointly emulate a behavior of a resistive element.

* * * * *